UNITED STATES PATENT OFFICE.

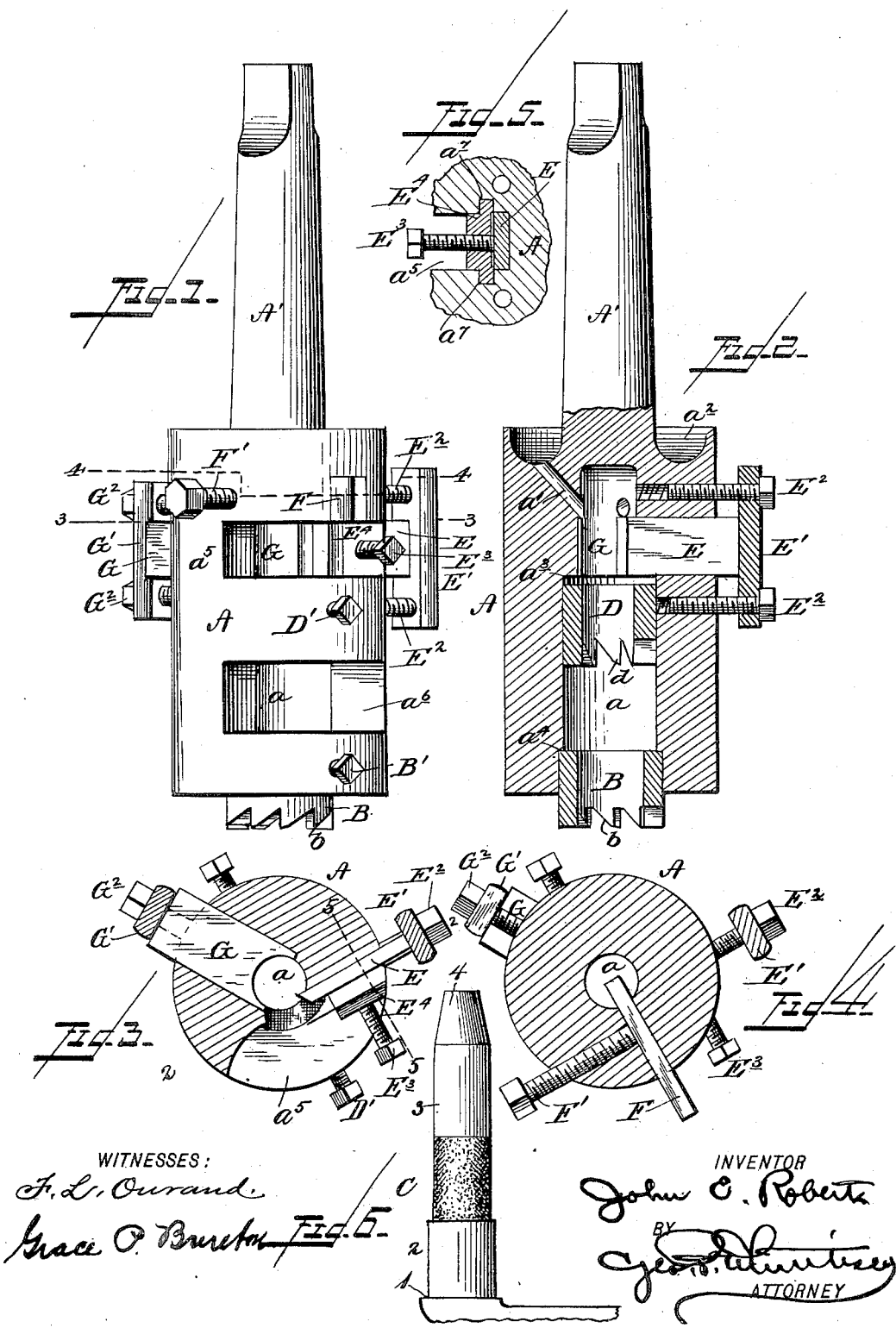

JOHN E. ROBERTS, OF JAMESTOWN, NEW YORK, ASSIGNOR TO THE STRAIGHT MANUFACTURING COMPANY, OF SAME PLACE.

ROTARY CUTTER-HEAD.

SPECIFICATION forming part of Letters Patent No. 661,554, dated November 13, 1900.

Application filed November 27, 1899. Serial No. 738,434. (No model.)

*To all whom it may concern:*

Be it known that I, JOHN E. ROBERTS, a citizen of the United States, residing at Jamestown, in the county of Chautauqua and State of New York, have invented certain new and useful Improvements in Rotary Cutter-Heads; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to machine-tools; and its object is to provide a tool which shall at one operation shape and finish a bicycle crank-shaft or similar article. Heretofore such work has been done in a lathe, and the output per day for a skilled hand was comparatively small. By means of my improved tool, used in an upright drill-press, one man can attend to at least four machines and turn out a vastly-increased amount of work, all finished to an exact size.

The invention is shown in the accompanying drawings, wherein—

Figure 1 is a side elevation of the tool. Fig. 2 is a longitudinal section thereof on the line 2 2, Fig. 3. Fig. 3 is a cross-section on the line 3 3, Fig. 1. Fig. 4 is a cross-section on the line 4 4, Fig. 1. Fig. 5 is a section on the line 5 5, Fig. 3; and Fig. 6 shows the work done by the tool illustrated.

The tool has a cylindrical body A and a shank A', integral therewith. The body is centrally bored out to form a chamber $a$, extending nearly to the upper end of the body and communicating by one or more ducts $a'$ with an annular oil-well $a^2$, formed in the upper end of the body concentric with the shank. The chamber $a$ is counterbored twice to form the internal shoulders $a^3$ $a^4$. Transverse slots $a^5$ $a^6$ are cut in one side of the body, intersecting with the central chamber.

In the lower and larger counterbore $a^4$ is seated an annular milling-cutter B, whose teeth $b$ cut both on their annular edges and on their inner sides. The cutter is therefore adapted to face off the shoulder 1 of the crank C, as well as shape and finish the cylindrical portion 2 to a given diameter. A set-screw B' retains the cutter in place. A second cutter is provided to shape and finish the cylindrical portion 3 of the crank. This is preferably an annular milling-cutter D, seated in the smaller counterbore and near the inner shoulder $a^3$. Its teeth $d$ cut on the edge and inside, like those of the cutter B. It is retained in place by a set-screw D'. A third cutter is arranged to form the taper 4 at the end of the crank. This is preferably a flat cutter E, inserted through the upper slot $a^5$ and held to its work by a cross-bar E', through the ends of which screws $E^2$ are passed into threaded holes in the body A. A clamping-screw $E^3$ is tapped through a block $E^4$, which is rabbeted to fit into grooves $a^7$, cut in the body A along each side of the slot $a^5$. The end of the crank is faced off by a straight cutter F, which passes in through a slot in the body A, preferably in a radial direction, and enters the upper part of the chamber $a$. A set-screw F' holds this cutter in place. Opposite the tapering cutter is a bearing or steady block G, inserted through a slot in the body A and having a semicircular groove in its inner end to fit the portion 4 of the crank. This steady-block is made of some antifriction metal, such as phosphor-bronze, and holds the crank truly in a central position. It can be adjusted by means of a cross-bar G' and adjusting-screws $G^2$.

In operation the tool is attached to the spindle of an ordinary upright automatic drill-press, and the blank to be dressed is placed in a suitable jig on the bed of the press. The tool is run down until the blank has entered the chamber $a$, and it is then left to itself, the tool centering the work as it cuts. When finished, the press stops automatically in the usual manner. It will be seen that this is a much simpler and more rapid operation than lathe-work and that one man can readily attend to several presses equipped with these tools. Moreover, every crank-shaft is finished to an exact size.

Having thus described my invention, what I claim, and desire to secure by Letters Patent, is—

1. A rotary self-centering tool for finishing crank-shafts and the like, having a central chamber, one or more annular cutters in said chamber, for acting on the work, and additional cutters in the walls of said chamber automatically acting on the work simultaneously with said annular cutters.

2. A rotary tool for finishing crank-shafts and the like, having a central chamber provided with perforations in its wall, one or more annular cutters in said chamber for acting on the work, side cutters in said perforations acting simultaneously with the annular cutters, and automatic means for centering the work relative to the cutters.

3. A rotary tool for finishing crank-shafts and the like, having a central chamber containing one or more side perforations, annular cutters in said chamber, additional cutters entering said chamber through said perforations, and means for centering the work relative to the cutters.

4. A rotary tool for finishing crank-shafts and the like, having a central chamber containing side perforations, one or more annular cutters in said chamber, additional cutters entering said chamber through said side perforations, and automatic means for centering the work relative to the cutters.

5. A rotary tool for finishing crank-shafts and the like, having a central chamber containing perforations in its wall, one or more annular cutters in said chambers, side cutting-tools entering the chamber through said perforations, and adjustable automatic means in said wall for centering the work relative to the cutters.

6. A tool for shaping and finishing crank-shafts, and the like, comprising a cylindrical body having a central chamber, counterbored at one or more points, an annular milling-cutter concentric with said chamber at its lower end, a second annular cutter above the first, a flat taper cutter, and a facing-off cutter, inserted through slots in the body, and means for holding and adjusting said cutters.

7. A tool for shaping and finishing crank-shafts and the like, comprising a cylindrical body having a central chamber provided with counterbores, and radial and transverse slots, an annular milling-cutter in each counterbored portion, a straight taper cutter and a straight facing-off cutter received in said slots, and means for clamping and adjusting said cutters.

8. A tool for shaping and finishing crank-shafts and the like, comprising a cylindrical body having a central chamber, annular milling-cutters concentric with said chamber, straight taper and facing-off cutters, and a steady-block inserted through a slot in the body opposite the taper cutter.

9. The combination with the body A, having the central chamber $a$, of annular milling-cutters B and D received in said chamber, a straight taper cutter E inserted through the side of the body A, a steady-block G of antifriction material, having a semicircular groove in its inner end and inserted through a radial slot in the body opposite the taper cutter, and means for holding and adjusting said block.

10. The combination with the body A, having a central chamber $a$, and transverse slot $a^5$, provided with grooves $a^7$, of a cutter E received in the slot $a^5$ and projecting into the chamber, a block $E^4$ rabbeted to fit the grooves $a^7$, and a screw $E^3$ tapped through the block against the cutter.

In testimony whereof I affix my signature in presence of two witnesses.

JOHN E. ROBERTS.

Witnesses:
H. R. LEWIS,
EMMA SIEGEL.